(12) United States Patent
Hottebart

(10) Patent No.: US 6,170,544 B1
(45) Date of Patent: Jan. 9, 2001

(54) NONPNEUMATIC DEFORMABLE WHEEL

(75) Inventor: François Hottebart, Royat (FR)

(73) Assignee: Compagnie Generale des Etablissements Michelin - Michelin & Cie, Clermont-Ferrand Cedex (FR)

( * ) Notice: Under 35 U.S.C. 154(b), the term of this patent shall be extended for 0 days.

(21) Appl. No.: 09/199,925

(22) Filed: Nov. 25, 1998

Related U.S. Application Data

(63) Continuation-in-part of application No. PCT/EP98/01678, filed on Mar. 23, 1998.

(30) Foreign Application Priority Data

Mar. 27, 1997 (FR) .................................................. 97 03926

(51) Int. Cl.[7] .................................................... B60C 7/10
(52) U.S. Cl. .................................. 152/11; 152/5; 301/55; 301/104
(58) Field of Search ......................... 301/55, 104; 152/1, 152/5, 7, 11, 12, 17, 75, 80, 84

(56) References Cited

U.S. PATENT DOCUMENTS

| 1,331,716 | 2/1920 | Metz . | |
|---|---|---|---|
| 1,424,101 | * 7/1922 | Johnson | 152/17 |
| 1,692,001 | 11/1928 | Stenberg . | |
| 3,234,988 | 2/1966 | Cummings . | |
| 4,729,605 | * 3/1988 | Imao et al. | 301/104 |
| 4,858,297 | * 8/1989 | Longcamp | 301/55 |
| 4,867,217 | 9/1989 | Laurent . | |
| 5,110,190 | * 5/1992 | Johnson | 301/104 |

FOREIGN PATENT DOCUMENTS

| 432268 | 9/1967 | (CH) . | |
|---|---|---|---|
| 299305 | 7/1916 | (DE) . | |
| 190968 | * 8/1986 | (EP) | 152/17 |
| 379090 | 10/1907 | (FR) . | |
| 553969 | 6/1923 | (FR) . | |
| 1064851 | * 5/1954 | (FR) | 152/5 |
| 1005 | * of 1911 | (GB) | 152/11 |
| 4-221201 | * 8/1992 | (JP) | 152/5 |

* cited by examiner

Primary Examiner—Russell D. Stormer
(74) Attorney, Agent, or Firm—Baker Botts L.L.P.

(57) ABSTRACT

A deformable structure for a vehicle, designed to roll on an axis of rotation, including an annular internal element centered on the axis, an annular external element, flexible and appreciably inextensible, forming a tread radially arranged externally relative to the internal element, a plurality of spokes arranged substantially radially between the internal element and the external annular element, each spoke being capable of opposing a radial compressive stress, beyond a given threshold, an appreciably constant force, the external element having a circumferential length such that the spokes are preloaded in radial compression, and in which provision is made for stabilizing the relative positions of the internal element and external element, characterized in that the spokes are formed and arranged between the internal and external elements, in such a way that their flexibility in a meridian plane is well below their flexibility in a circumferential plane, and in that the of stabilization limits the amplitude of a circumferential relative rotation between the internal element and the external element.

14 Claims, 6 Drawing Sheets

NONPNEUMATIC DEFORMABLE WHEEL

This application is a continuation-in-part of PCT/EP 98/01678, filed Mar. 23, 1998.

BACKGROUND OF THE INVENTION

The present invention concerns nonpneumatic wheels, notably, those capable of being used in substitution for tires on vehicles.

It has been tried for a long time to design such nonpneumatic wheels, that is, operating without compressed air, in order to overcome every problem raised by flats or reduction of inflation pressure of tires.

Among very numerous proposals, the one described in U.S. Pat. No. 3,234,988 can be cited. That patent describes a nonpneumatic deformable wheel containing a disk, an internal element fastened to the disk, an annular external element, flexible and appreciably inextensible, intended to come in contact with the road, and a plurality of spokes arranged between the internal and external elements. The external element has a length such that it stresses the spokes under radial compression. In other words, they are prestressed (that is, preloaded). Beyond a certain stress threshold, since the spokes are stressed on end, the radially oriented reaction force that each of those spokes can develop remains constant. The wheel also contains means of stabilization of the relative positions of the external and internal elements. The spokes bend in a meridian plane and the means of stabilization limit the relative axial displacements of the internal and external elements.

This deformable wheel uses as connection between the internal and external elements spokes prestressed beyond their buckling load. Thus, in case of increase of the load supported by the wheel, that increase is compensated only by an increase in number of spokes actually supporting the load. This results in an increase of length of the contact between the wheel and the road. Such behavior is very close to that of a tire.

This wheel presents, however, one major disadvantage. The different spokes buckle in their meridian planes, but have practically no possibility of circumferential deformation, for their section presents great inertia in the circumferential direction. Now, on rolling, considerable longitudinal forces are undergone by the external element in contact with the road, notably, in the area of contact, which leads to rapid deterioration of the previous nonpneumatic wheel.

SUMMARY OF THE INVENTION

The object of the invention is a deformable structure designed to constitute, with a disk, for example, a nonpneumatic wheel presenting the same advantages of comfort and performance, while solving the preceding problem.

The deformable structure for a vehicle, according to the invention, designed to roll on an axis of rotation, comprises an annular internal element centered on the axis, an annular external element, flexible and appreciably inextensible, forming a tread, radially arranged externally relative to the internal element, a plurality of spokes arranged between the internal and external elements, each spoke being capable of opposing an appreciably constant force under a radial compressive stress beyond a given threshold, the annular external element having a length such that the spokes are prestressed in radial compression, as well as means for stabilizing the relative positions of the internal and external elements. This rolling structure is characterized in that the spokes are formed and arranged between the internal element and external element, in such a way that their flexibility in a meridian plane is well below their flexibility in a circumferential plane, and in that the means for stabilizing limit the amplitude of a circumferential relative rotation between the internal and external elements.

The wheel obtained from the deformable structure according to the invention presents the following advantage: each spoke can be deformed in a circumferential direction, in particular during rolling, when it is in the zone of contact between the external element and the road.

The spokes are preferably prestressed beyond their buckling load. The means of stabilization can also include elastic connections nonradially joining the internal and external elements, such as cables or slender beams. The means of stabilization are prestressed in extension in state of rest in order to exert a return force immediately upon a relative rotation displacement between the internal and external elements. The ends of the spokes can be fastened by embedding or by joints in the internal element and/or external element. The means of stabilization can also be a thin shell prestressed in radial extension.

The deformable structure according to the invention can also constitute a safety insert designed to be mounted in an assembly consisting of a tire and a rim.

DESCRIPTION OF THE DRAWINGS

Several embodiments of the invention are now described by means of the following figures.

DESCRIPTION OF PREFERRED EMBODIMENTS

Figure 1:
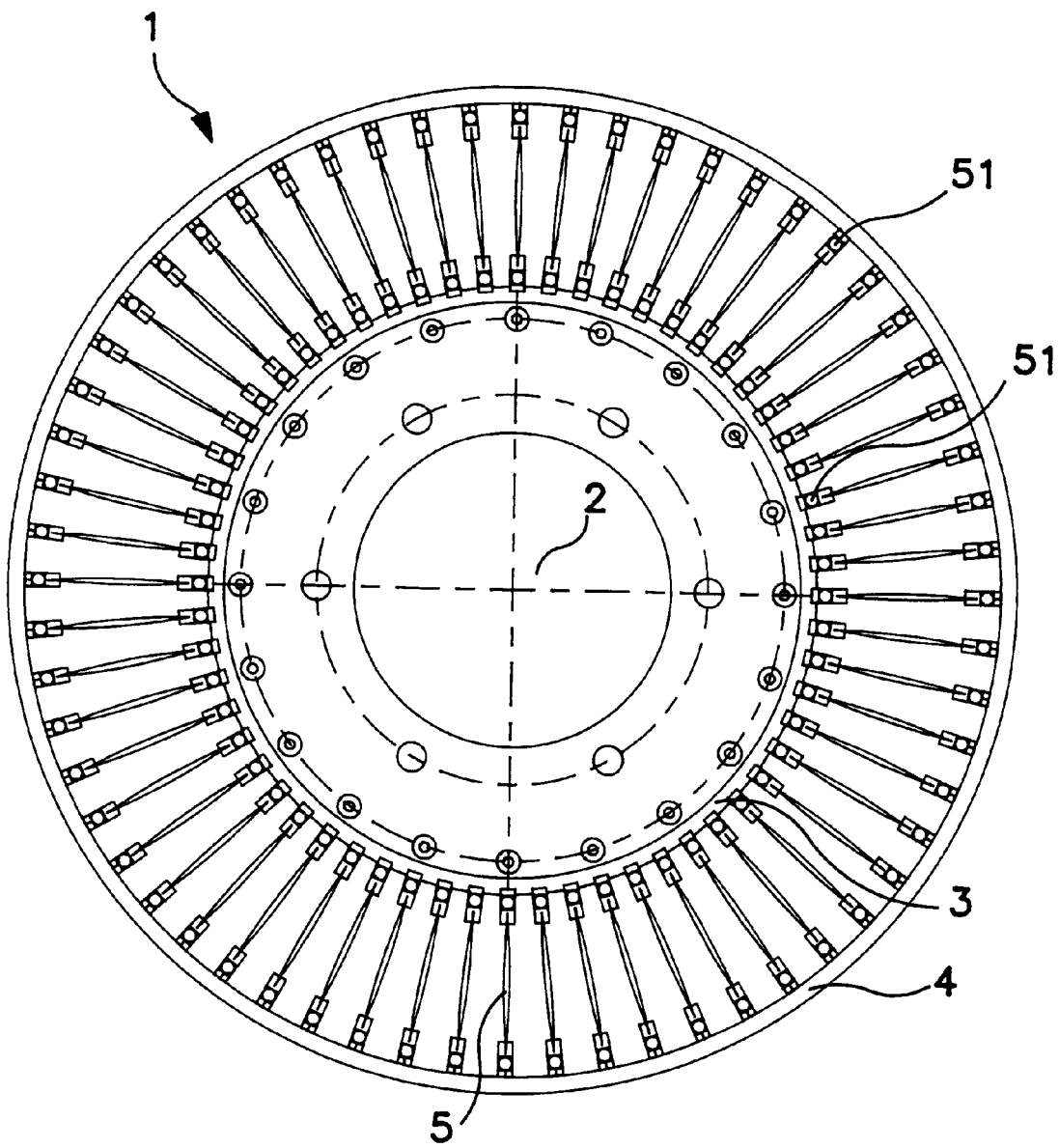
FIG. 1 is an axial view of a wheel according to the invention consisting of a deformable structure fastened to a disk.
Figure 2:
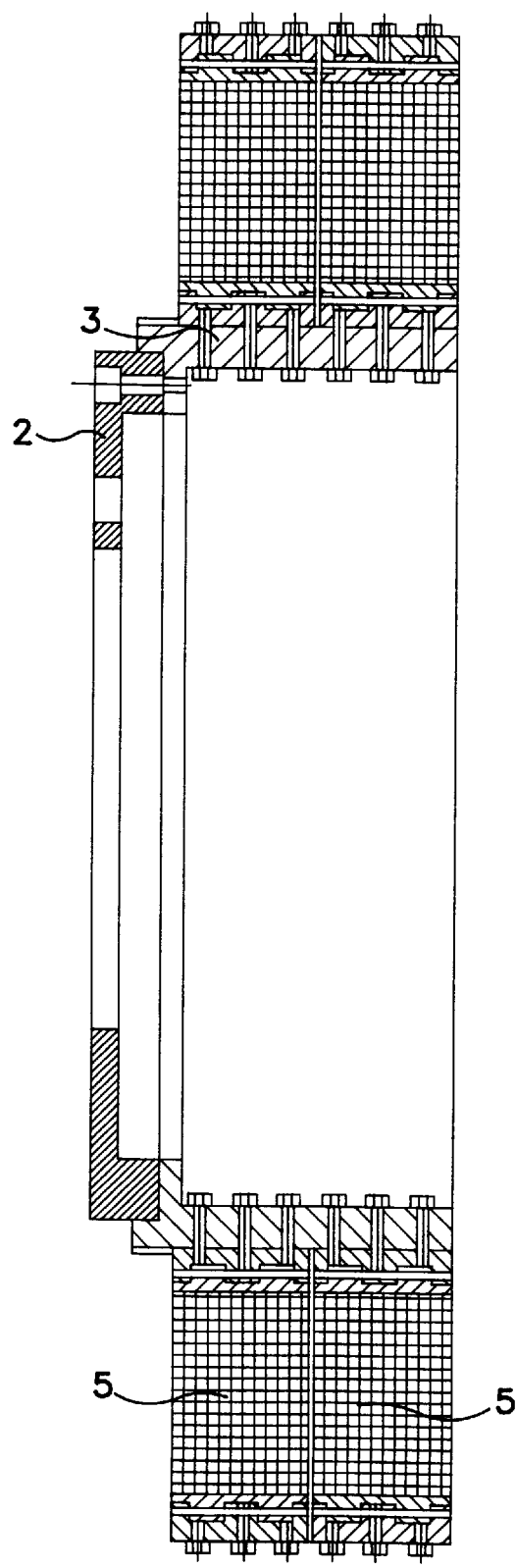
FIG. 2 is a meridian section of the wheel of FIG. 1.

FIGS. 1 and 2 present, in axial view and in meridian section, respectively, a nonpneumatic wheel consisting of a deformable structure 1 according to the invention, attached to a disk 2. The deformable structure 1 includes an internal element 3 connected to the disk 2, an annular external element 4 and spokes 5 joining the internal element 3 and the external element 4. The spokes 5 are distributed in two sets of 60 elements arranged axially side by side (FIG. 2). The spokes 5 have a parallel epipedal shape with a small thickness relative to their length and width. This shape makes it possible to bend them easily in the direction of their thickness. The spokes 5 have their two longitudinal ends fastened, respectively, to the internal element 3 and to the external element 4 by joints 51. The spokes are so arranged between the internal element 3 and external element 4 that their length is in a radial direction, their width is in an axial direction, and their thickness is in a circumferential direction. Consequently, the spokes 5 can bend under a radial compression of their longitudinal ends. The bending is circumferential. The flexibility of the spokes 5 in a meridian plane is therefore much less than their flexibility in a circumferential plane. In the embodiment of FIGS. 1, 2 and 4, the joints 51 consist of two parts 511 and 512 (see FIG. 4), fastened to each other by a pin 513. That method of fastening makes possible a free rotation between both parts 511 and 512 of the joints 51. The pins 513 are arranged in the axial direction of the wheel. The method of connection allows a rotation of the spokes 5 relative to the internal and external elements in the plane of the wheel. The spokes 5 are, for example, made of a fiberglass-reinforced polymer material. The annular external element 4 comprises a thin metal hoop (in the order of 0.1 to 1 mm thick) covered with an elastomer layer designed to come in contact with the road (the elastomer layer is not shown in FIG. 2). The external element thus has a low flexural strength and is appreciably inextensible. The circumferential length of said external element 4 is such that the spokes 5 are all prestressed in axial compression beyond their buckling load. All such spokes 5 are therefore in postbuckling state. Consequently, the reaction force they oppose to the internal element 3 and external element 4 is appreciably constant and independent of their radial compression.

Figure 3:
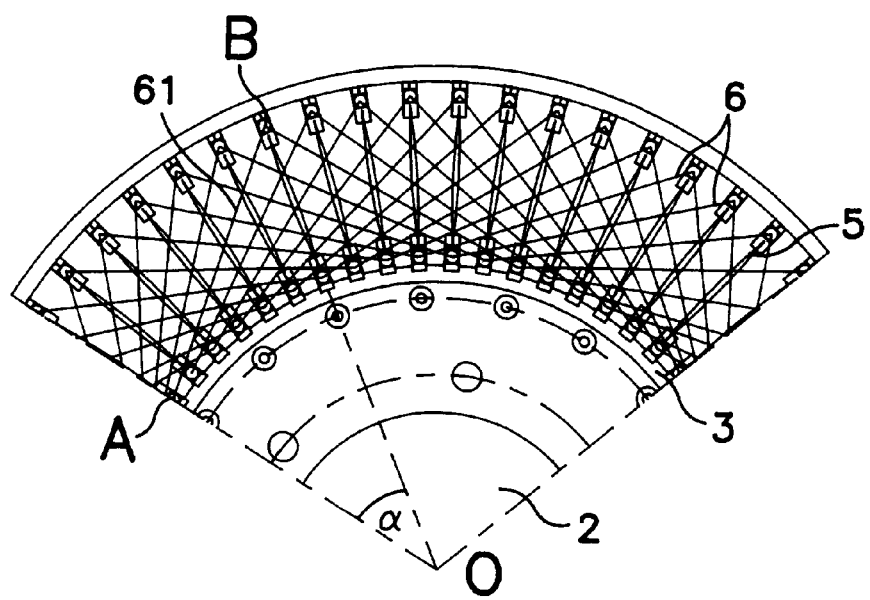
FIG. 3 is a partial axial view of a wheel similar to that of FIGS. 1 and 2, equipped with stabilization means.

The wheel, as presented in FIGS. 1 and 2, is in unstable state of equilibrium, and the energy stored in the spokes 5 tends to be released by a rotation displacement of the external element 4 relative to the internal element 3. In order to limit the relative rotation between the internal element 3 and the external element 4, the deformable structure 1 is provided with means of stabilization presented in FIG. 3. The means of stabilization consist, for example, of cables 6 joining the internal element 3 and the annular external element 4. In FIG. 3, the cable 61 is shown fastened at A to the internal element 3 and fastened at B to the external element 4. O being on the axis of rotation of the wheel, the angle AOB=α is, in the example represented and at rest, equal to 30 degrees. The angle AOB can vary from 1 to 45 degrees and preferably between 25 and 35 degrees. The cables 6 are formed and arranged to be taut at rest. Said cables 6 thus contain the rotational displacement of the annular external element 4 relative to the internal element 3, even though punctual relative displacements in the area of contact remain possible. The stiffness, arrangement, extension prestressing and number of those cables influence the propensity to maintain, on the whole, the position of equilibrium shown in FIG. 1.

On the other hand, the cables make it possible to adjust the circumferential stiffness of the wheel according to their particular stiffness in extension, as well as depending on their inclination relative to the circumferential direction. The cables can also be of several different thicknesses on both sides of their anchoring point in the internal element and external element, which entails a variation of response of the wheel to a torque applied circumferentially. The angles of inclination can also be changed on both sides of their anchoring points in order to obtain such asymmetry of mechanical response. The cables can also be substituted by more monolithic elements or any equivalent means of stabilization.

Figures 4A, 4B:
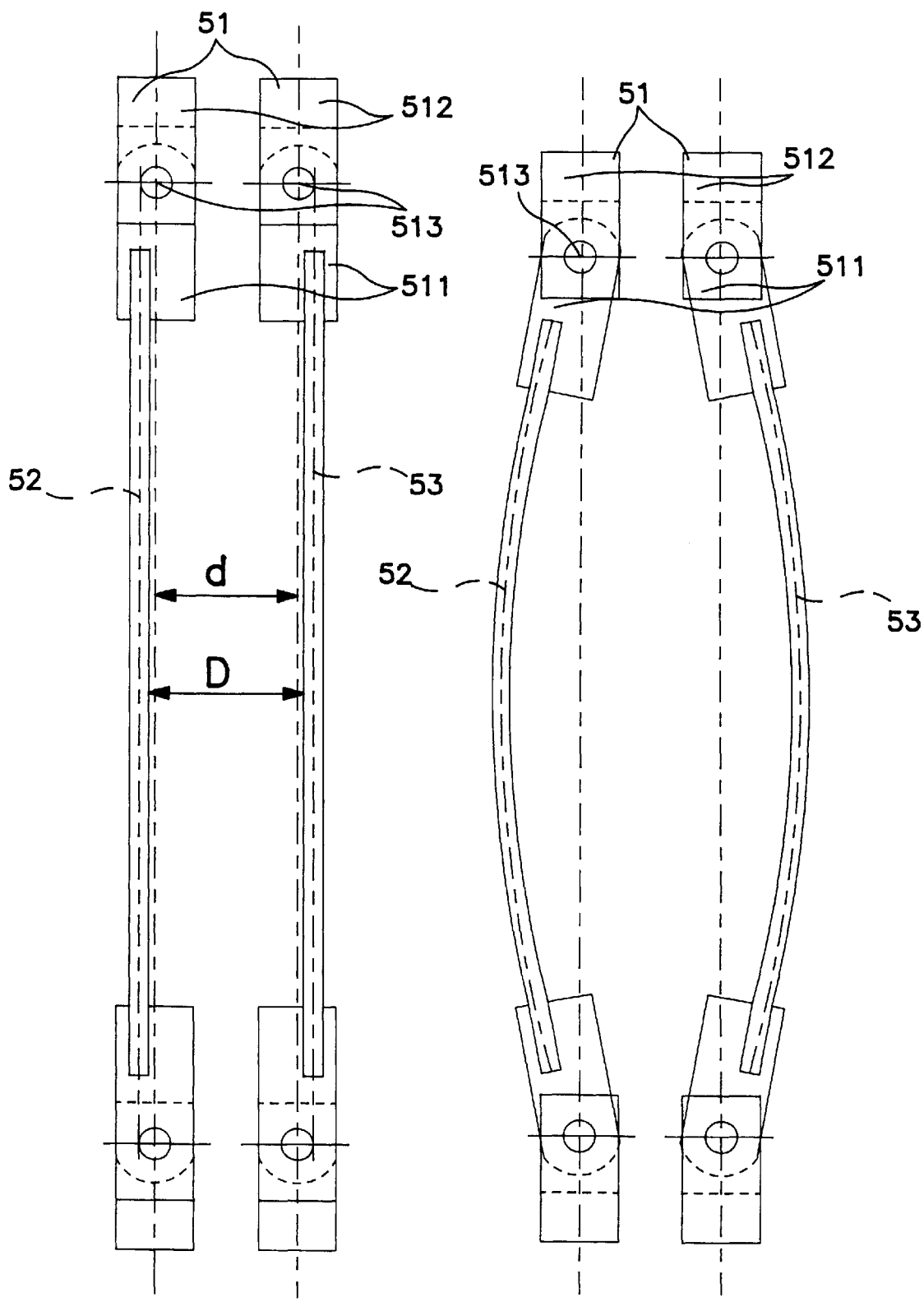
FIG. 4 presents jointed double spokes in state of rest 4a and in deformed state 4b.

FIGS. 4 and 5 present other methods of arrangement and connection of the spokes to the internal element 3 and external element 4. FIG. 4 shows two spokes 52 and 53 with their joints 51. As previously, the joints 51 contain two parts, the first 511, where a longitudinal end of the spoke 52, 53 is embedded, and the second 512, rigidly fastened to the internal element or external element. Those two parts are joined by a pin 513, placed, wheel mounted, in the axial direction of the deformable structure 1. In the embodiment of FIG. 4, the spokes are arranged between the internal and external elements circumferentially in pairs with, as before, their bending plane oriented circumferentially. The longitudinal ends of the spokes 52 and 53 are embedded in supports 511, so that the distance D separating the two spokes is greater than the distance d separating the two pins 513. Consequently, on an axial compression, a torque is applied on the spokes and imparts a circumferential bending of the two spokes in two opposite directions, so that their center parts diverge (FIG. 4b). This design has the advantage of facilitating buckling of the spokes always in the same direction.

Figures 5A, 5B:
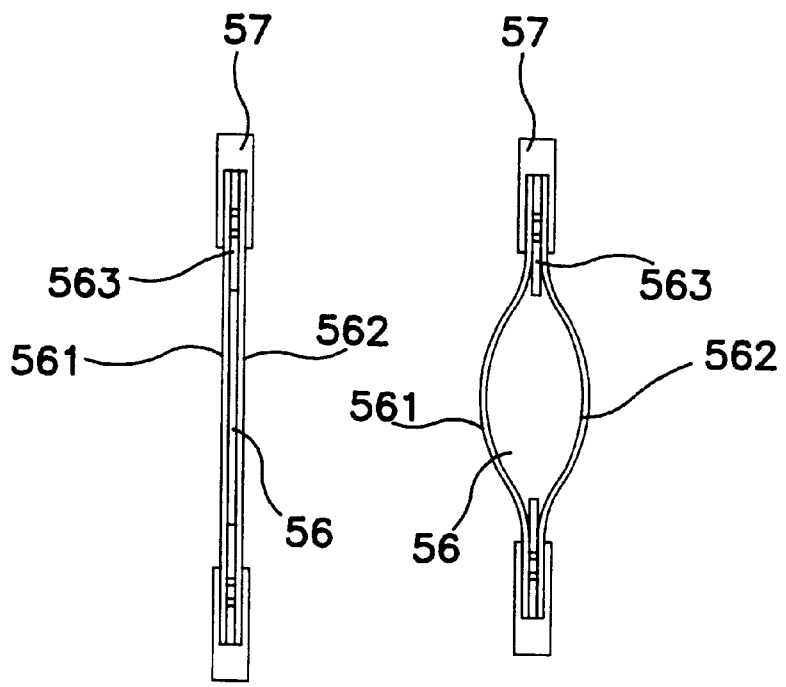
FIG. 5 presents another embodiment of the spokes, double and embedded, in state of rest 5a and in deformed state 5b.

FIG. 5 presents a double spoke 56 embedded in a support 57. In contrast to the preceding embodiments, this support 57 comprises only one part rigidly connected to the internal or external elements. Spoke 56 consists of two parallel epipedal half-spokes 561 and 562 arranged circumferentially side by side and embedded in supports 57. Supports 57 are fastened to the internal and external elements. The half-spokes are separated circumferentially by a plate 563. The plate orients, as previously, the circumferential bending of the two half-spokes in two opposite directions, so that their center parts diverge (FIG. 5b).

Figure 6A:
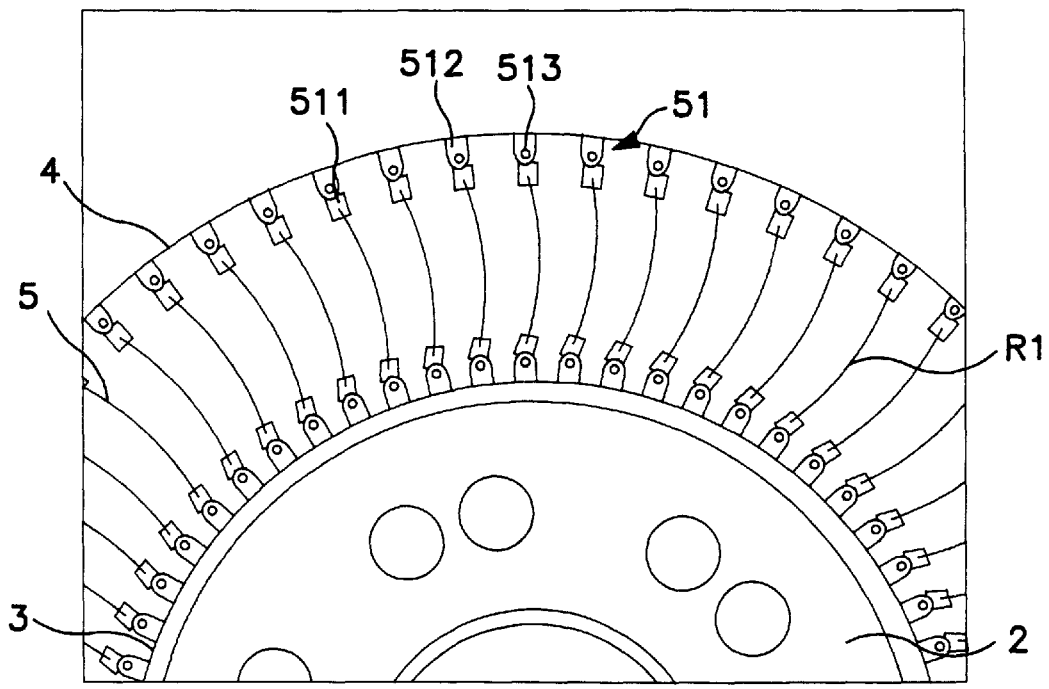
FIG. 6 presents spokes of the wheel of FIG. 1 under load, outside area of contact 6a and in area of contact 6b.
Figure 6B:
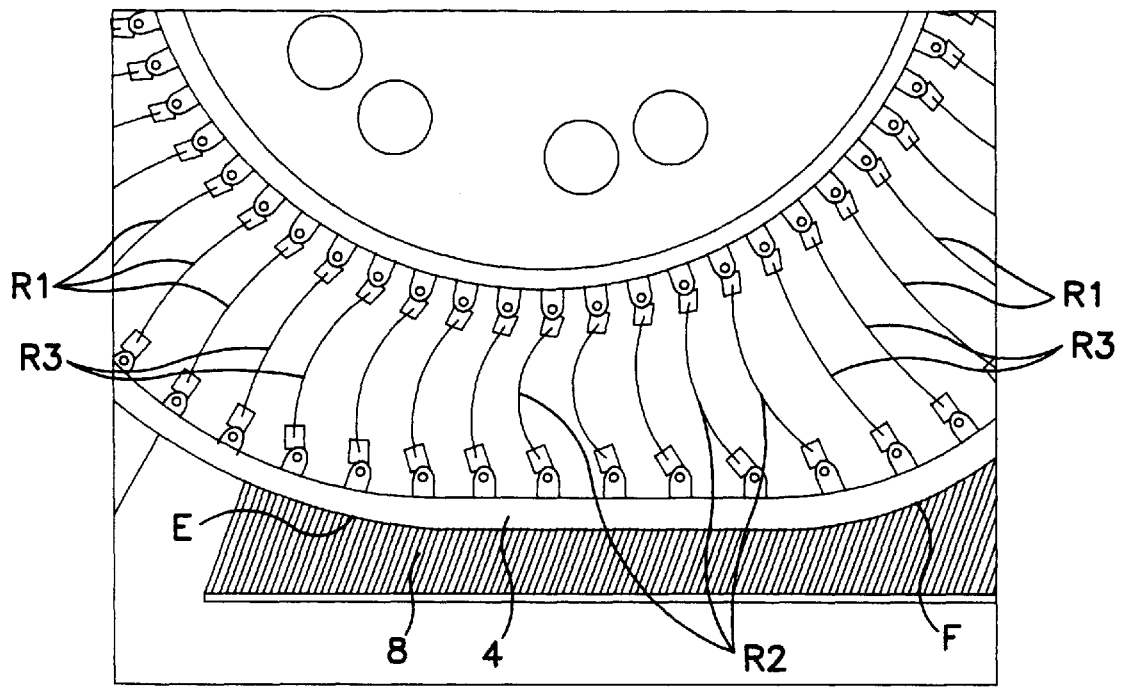
Figure 7A:
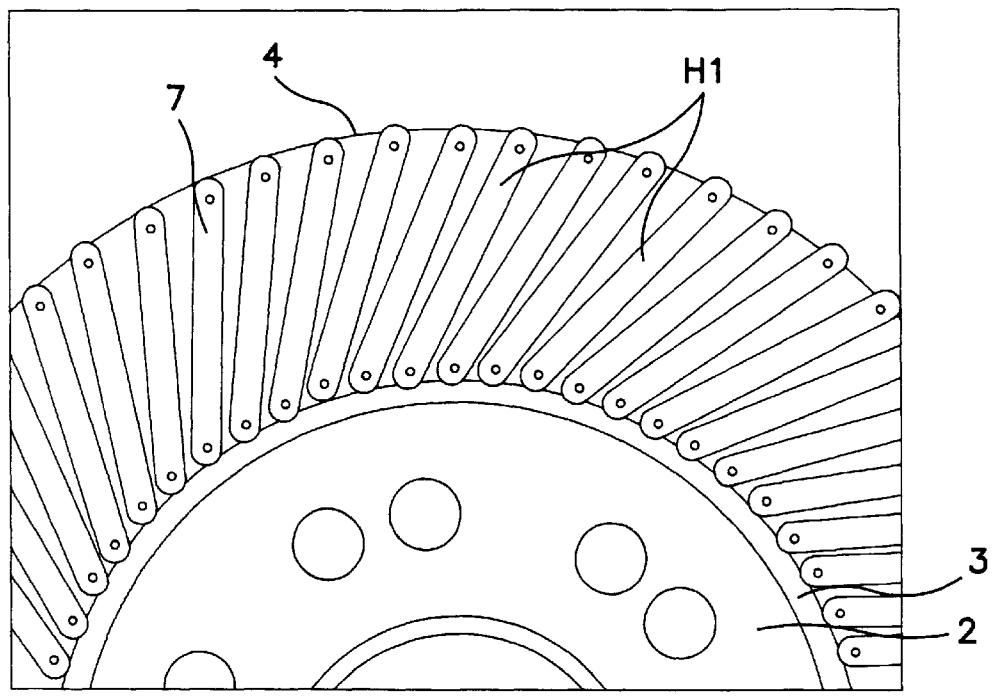
FIG. 7 presents means of stabilization of the wheel of FIG. 6 under load, outside area of contact 7a and in area of contact 7b.
Figure 7B:
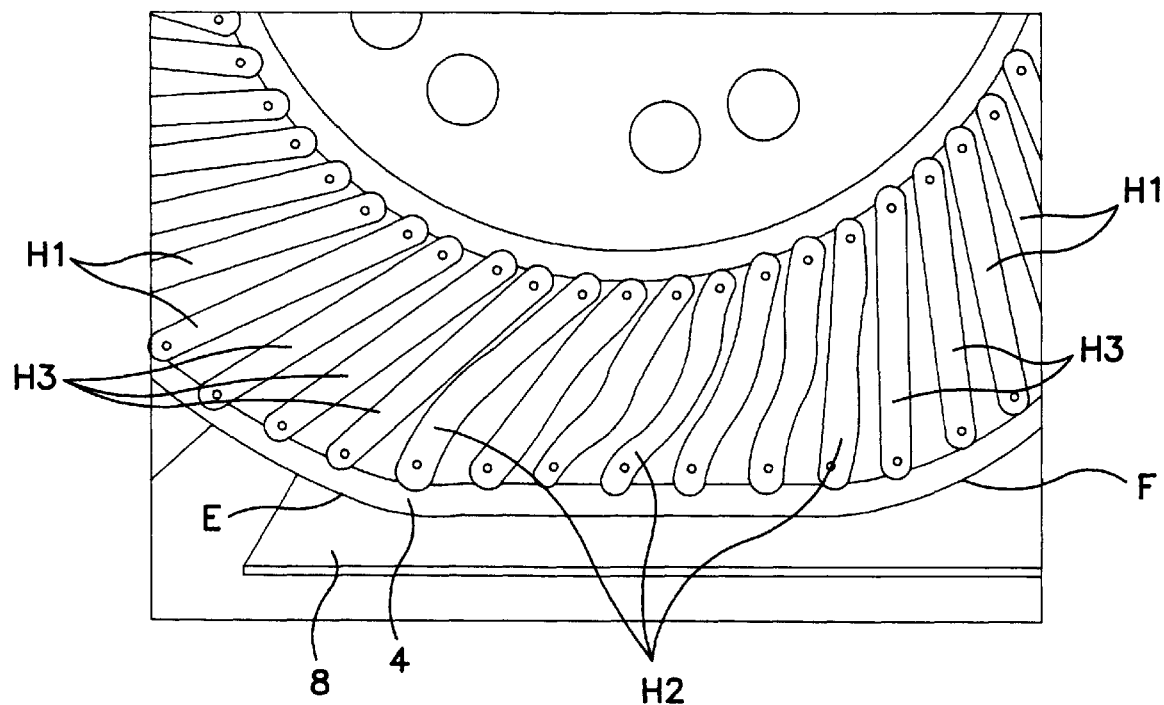

FIGS. 6 and 7 illustrate schematically the behavior of a wheel containing a deformable structure upon being crushed on a flat road. The wheel contains two sets of spokes 5 similar to those of FIGS. 1, 2 and 3 and stabilization means 7 consisting of two sets of polyurethane square-section beams. The two sets of beams 7 have a nonradial inclination and are arranged symmetrically on both sides of the radial direction, as illustrated on FIG. 3. The modulus of extension of the beams is in the order of 20 MPa. The orientation of the beams 7 is similar to that of the cables 6 presented in FIG. 3. In FIGS. 6b and 7b only, the external element 4 has been represented with a layer of elastomer material assuring contact with the road 8. The layer has a thickness of approximately 10 mm. For the sake of clarity of presentation, the course of behavior of only one of the two sets of spokes 5 outside the area of contact (6a) and in the area of contact (6b) is represented in FIGS. 6a and 6b, and the course of just one of the two sets of beams in (7b) and outside the area of contact (7a) is represented in FIGS. 7a and 7b.

Upon crushing of the wheel 1 on a road 8, one finds that the spokes 5 all remain in postbuckling state, but with marked variations of radial compression. Three cases arise: outside the areas of contact (6a)—spokes R1—the spokes show a slight radial compression; in the area of contact, between points E and F, the spokes R2 show a markedly greater radial compression; in proximity to entry and exit from the area of contract, the spokes R3 show an intermediate radial compression. The radial compression of the spokes 5 directly depends on the radial distance between the internal element and external element and, therefore, on the deflection of the wheel upon being crushed on the road.

As each spoke is in a postbuckling state, it exerts an appreciably constant reaction force on the external element 4. In the zone of contact between the ground and the wheel, the area of contact, the external element or tread therefore exerts an appreciably constant mean pressure on the ground. The force is practically unaltered by the amplitude of the radial compression supported by the spoke 5, and the pressure exerted by the annular external element in the corresponding zone is thus appreciably independent of the amplitude of the deflection assumed by the crushed wheel. This behavior is thus very close to that of a tire. It makes it possible to absorb the unevennesses of the road without entailing harsh reactions transmitted to the wheel disk, or generating significant variations of the surface of contact between wheel and road. This behavior is very close to that of a tire.

FIG. 7 illustrates the course of just one of the two sets of beams in (7b) and outside the area of contact (7a). Three cases arise: the beams whose points of anchoring to the internal and external elements are outside the area of contact (7a)—beams H1—are in a slightly taut state; the beams—beams H2—whose points of anchoring to the external element are in the area of contact, between points E and F, are in a state of buckling; the beams arranged on entry and exit from the area of contact—beams H3—are in an intermediate state. One thus finds that the beams, one anchoring point of which is in the area of contact, have their tension relaxed by the radial compression of the external element which brings the anchoring points of the beams together between the internal element and the external element. Consequently, the beams, whose section is small, buckle and only weakly oppose that radial compression of the external element in the area of contact or on running over an obstacle.

The wheel presented also has the advantage of excellent homogeneity of contact pressures between the annular external element and a flat road in the axial direction, owing to the symmetry of construction of the spokes appearing in FIG. 2.

An external element 4 can easily be made by vulcanizing a thickness of rubber on a belt. The belt can be a flat steel sheet of width L and 0.1 mm thick.

The deformable structure according to the invention can also be provided with means to limit radial compression of the spokes, such as stops. For example, it is possible to provide between the two axially juxtaposed set of spokes of FIGS. 1 to 3 an annular stop fastened to the internal element, of such outer diameter that it limits the maximum axial compression of those spokes to approximately 50%.

In the examples presented in FIGS. 1 to 3, two sets of axially juxtaposed spokes have been arranged, but it is entirely possible to increase that number of axially juxtaposed sets appreciably, in order to improve the behavior of the wheel or insert formed on an uneven road. The external element can likewise be formed by one or more axially juxtaposed elements.

I claim:

1. A deformable structure for a vehicle, designed to roll on an axis of rotation, comprising an annular internal element centered on the axis, an annular external element, flexible and appreciably inextensible, forming a tread radially arranged externally relative to said internal element, a plurality of substantially radial spokes between the internal element and the external annular element, each spoke being capable of opposing a substantially constant force under a radial compressive stress beyond a given threshold, said external element having a circumferential length such that said spokes are preloaded in radial compression, and means for stabilizing the relative positions of the internal element and external element, characterized in that said spokes are formed and arranged between the internal and external elements, in such a way that they have a flexibility in a meridian plane well below their flexibility in a circumferential plane oriented in the circumferential direction followed by the external element, and in that said means of stabilization limit the amplitude of a circumferential relative rotation between the internal element and the external element.

2. A deformable structure according to claim 1, in which the spokes are preloaded beyond their buckling load.

3. A deformable structure according to claims 1, in which the means of stabilization comprise nonradially elastic connecting elements joining the external element and the internal element.

4. A deformable structure according to claim 3, in which the elastic connecting elements are taut when said structure is at rest.

5. A deformable structure according to claim 3, in which the elastic connecting elements join points of the annular external element and the internal element separated at rest by an angle a ranging between 1 and 45 degrees.

6. A deformable structure according to claim 5, in which the elastic connecting elements join points of the annular external element and the internal element separated at rest by an angle α ranging between 25 and 35 degrees.

7. A deformable structure according to claim 3, in which the elastic connecting elements are cables prestressed in extension to exert a return force upon a relative rotational displacement between the internal and external elements.

8. A deformable structure according to claim 1, in which the means of stabilization comprise a thin shell prestressed in radial extension, placed between the internal and external elements.

9. A deformable structure according to claim 1, in which the ends of the spokes are embedded in the external element.

10. A deformable structure according to claim 1, in which the ends of the spokes are fastened by joints to the internal element and/or external element.

11. A deformable structure according to claim 1, comprising means for limiting the amplitude of radial compression of the spokes.

12. A nonpneumatic wheel for a vehicle, characterized in that it comprises a disk and a deformable structure according to claim 1.

13. A safety insert for a vehicle, designed to be mounted in an assembly comprising a tire and a rim, characterized in that it is constituted by a deformable structure according to claim 1.

14. A deformable structure according to claim 1, in which the ends of the spokes are embedded in the external element.

* * * * *

UNITED STATES PATENT AND TRADEMARK OFFICE
CERTIFICATE OF CORRECTION

PATENT NO. : 6,170,544 B1
DATED : January 9, 2001
INVENTOR(S) : Hottebart

It is certified that error appears in the above-identified patent and that said Letters Patent is hereby corrected as shown below:

<u>Column 6,</u>
Line 16, "claims 1," should read -- claim 1, --
Line 26, "a" should read -- α --
Line 40, "external" should read -- internal --

Signed and Sealed this

Twenty-fifth Day of December, 2001

Attest:

Attesting Officer

JAMES E. ROGAN
Director of the United States Patent and Trademark Office